US010528958B2

(12) United States Patent
Yang et al.

(10) Patent No.: US 10,528,958 B2
(45) Date of Patent: Jan. 7, 2020

(54) SYSTEMS AND METHODS FOR GENERATING RELATIONSHIPS VIA A PROPERTY GRAPH MODEL

(71) Applicant: MasterCard International Incorporated, Purchase, NY (US)

(72) Inventors: Peng Yang, Chesterfield, MO (US); Wally Lo Faro, Chesterfield, MO (US); Ravi S. Arvapally, O'Fallon, MO (US); Chris J. Merz, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 792 days.

(21) Appl. No.: 14/829,219

(22) Filed: Aug. 18, 2015

(65) Prior Publication Data

US 2017/0053294 A1    Feb. 23, 2017

(51) Int. Cl.
*G06Q 30/02* (2012.01)
*G06Q 20/12* (2012.01)
(Continued)

(52) U.S. Cl.
CPC ..... *G06Q 30/0201* (2013.01); *G06F 16/9024* (2019.01); *G06Q 20/12* (2013.01);
(Continued)

(58) Field of Classification Search
CPC .. G06Q 30/0201; G06Q 20/12; G06Q 20/389; G06Q 20/4016; G06Q 20/405; G06F 16/9024
See application file for complete search history.

(56) References Cited

U.S. PATENT DOCUMENTS 8,090,754 B2    1/2012  Schmidt et al.
8,185,558 B1 *  5/2012  Narayanan, Sr. ....... H04W 4/21
                                                    707/798
(Continued)

FOREIGN PATENT DOCUMENTS

JP      2015090689 A    5/2015

OTHER PUBLICATIONS

PCT Search Report and Written Opinion, Application No. PCT/US2016/046998, dated Nov. 8, 2016, 8 pps.

*Primary Examiner* — Sujay Koneru
(74) *Attorney, Agent, or Firm* — Armstrong Teasdale LLP

(57) ABSTRACT

A method of generating graph data components stored in a graph database is provided. The method is implemented using a graph component generator computing device in communication with a memory. The method comprises receiving transaction data from a relational database, wherein transaction data is derived from transactions, processed by a payment processor, between a first merchant of a plurality of merchants and a first cardholder of a plurality of cardholders, defining a graph including creating at least a first node representing at least the first merchant and a second node representing the first cardholder, identifying at least one relationship between at least two nodes including the first node and the second node in the graph based, at least in part, on transaction data common to the at least two nodes, and generating at least one edge between the at least two nodes, representing a new relationship between the at least two nodes.

21 Claims, 8 Drawing Sheets

(51) Int. Cl.
  *G06Q 20/38*     (2012.01)
  *G06Q 20/40*     (2012.01)
  *G06F 16/901*    (2019.01)

(52) U.S. Cl.
  CPC ......... *G06Q 20/389* (2013.01); *G06Q 20/405* (2013.01); *G06Q 20/4016* (2013.01)

(56) References Cited

U.S. PATENT DOCUMENTS

| | | |
|---|---|---|
| 8,719,071 B2 | 5/2014 | MacIntyre et al. |
| 8,812,482 B1 | 8/2014 | Kapoor et al. |
| 8,909,569 B2 | 12/2014 | Spivack et al. |
| 8,959,100 B2 | 2/2015 | Higgins et al. |
| 8,984,050 B2 | 3/2015 | Hanumolu et al. |
| 9,063,978 B1 | 6/2015 | Kapoor et al. |
| 9,087,088 B1 * | 7/2015 | Bose ................. G06F 17/30312 |
| 9,092,732 B1 | 7/2015 | Faratin et al. |
| 2007/0094066 A1 * | 4/2007 | Kumar ................... G06Q 10/04 706/61 |
| 2010/0169137 A1 | 7/2010 | Jastrebski et al. |
| 2011/0082718 A1 * | 4/2011 | Ghosh ..................... G06Q 20/00 705/7.29 |
| 2012/0197758 A1 | 8/2012 | Zhong et al. |
| 2012/0296724 A1 | 11/2012 | Faro et al. |
| 2012/0310956 A1 * | 12/2012 | Huhn ................. G06Q 30/0269 707/754 |
| 2014/0108461 A1 | 4/2014 | B'Far et al. |
| 2014/0279306 A1 | 9/2014 | Shi et al. |
| 2015/0294488 A1 * | 10/2015 | Iwasaki ................. G06T 11/206 345/440 |
| 2016/0092527 A1 * | 3/2016 | Kang ................ G06F 17/30569 707/756 |

* cited by examiner

SYSTEMS AND METHODS FOR GENERATING RELATIONSHIPS VIA A PROPERTY GRAPH MODEL

BACKGROUND OF THE INVENTION

The field of the invention relates generally to computerized generation of links between merchants and cardholders, more specifically, to systems and methods for generating connections between merchants and cardholders using a graph database based on transaction data.

As a matter of background, transaction data (e.g., payment data) may include data processed by a payment card processor over a payment network. Typically, such transaction data arrive at the payment processor and are stored in a data warehouse as individual records in a disconnected form. Individual records may be stored in a database, with tabulated records connected using unique identifiers. Thus, most models used for modeling such transaction data are based on properties of individual entities (i.e., cards, merchants, etc.).

However, a tremendous amount of information and insight is lost by retaining transaction data in tabular form, such as in a relational database table. It is cumbersome to detect whether individual records are connected across tables in any useful ways. More specifically, it is difficult to determine whether, for example, merchant records or payment cards stored in disconnected tables exhibit any common characteristics or linkages. At least some known methods of interconnecting tabulated data involve joining multiple tables. However, with large datasets containing millions or billions of records (e.g., those for merchants and payment cards), joining multiple tables to extract any useful information becomes tedious, if not impossible.

BRIEF DESCRIPTION OF THE INVENTION

In one aspect, a method of generating graph data components stored in a graph database is provided. The method is implemented using a graph component generator computing device in communication with a memory. The method comprises receiving transaction data from a relational database, wherein transaction data is derived from transactions, processed by a payment processor, between at least a first merchant of a plurality of merchants and a first cardholder of a plurality of cardholders, defining a graph including creating at least a first node representing at least the first merchant and a second node representing the first cardholder, identifying at least one relationship between at least two nodes including the first node and the second node in the graph based, at least in part, on transaction data that is common to the at least two nodes, and generating at least one edge between the at least two nodes, representing a new relationship between the at least two nodes.

In another aspect, a system for generating graph data components stored in a graph database is provided. The system comprises a graph database configured to store transaction data in a graph format and a graph component generator computing device (GCG) configured to be coupled to the graph database. The GCG is further configured to receive transaction data from a relational database, wherein transaction data is derived from transactions, processed by a payment processor, between at least a first merchant of a plurality of merchants and a first cardholder of a plurality of cardholders, define a graph including creating at least a first node representing at least the first merchant and a second node representing the first cardholder, identify at least one relationship between at least two nodes including the first node and the second node in the graph based, at least in part, on transaction data that is common to the at least two nodes, and generate at least one edge between the at least two nodes, representing a new relationship between the at least two nodes.

In yet another aspect, a non-transitory computer readable medium that includes computer executable instructions for generating graph data components stored in a graph database is provided. When executed by a graph component generator computing device (GCG), the computer executable instructions cause the GCG to receive transaction data from a relational database, wherein transaction data is derived from transactions, processed by a payment processor, between at least a first merchant of a plurality of merchants and a first cardholder of a plurality of cardholders, define a graph including creating at least a first node representing at least the first merchant and a second node representing the first cardholder, identify at least one relationship between at least two nodes including the first node and the second node in the graph based, at least in part, on transaction data that is common to the at least two nodes, and generate at least one edge between the at least two nodes, representing a new relationship between the at least two nodes.

BRIEF DESCRIPTION OF THE DRAWINGS

Like numbers in the Figures indicate the same or functionally similar components.

DETAILED DESCRIPTION OF THE INVENTION

Figure 1:
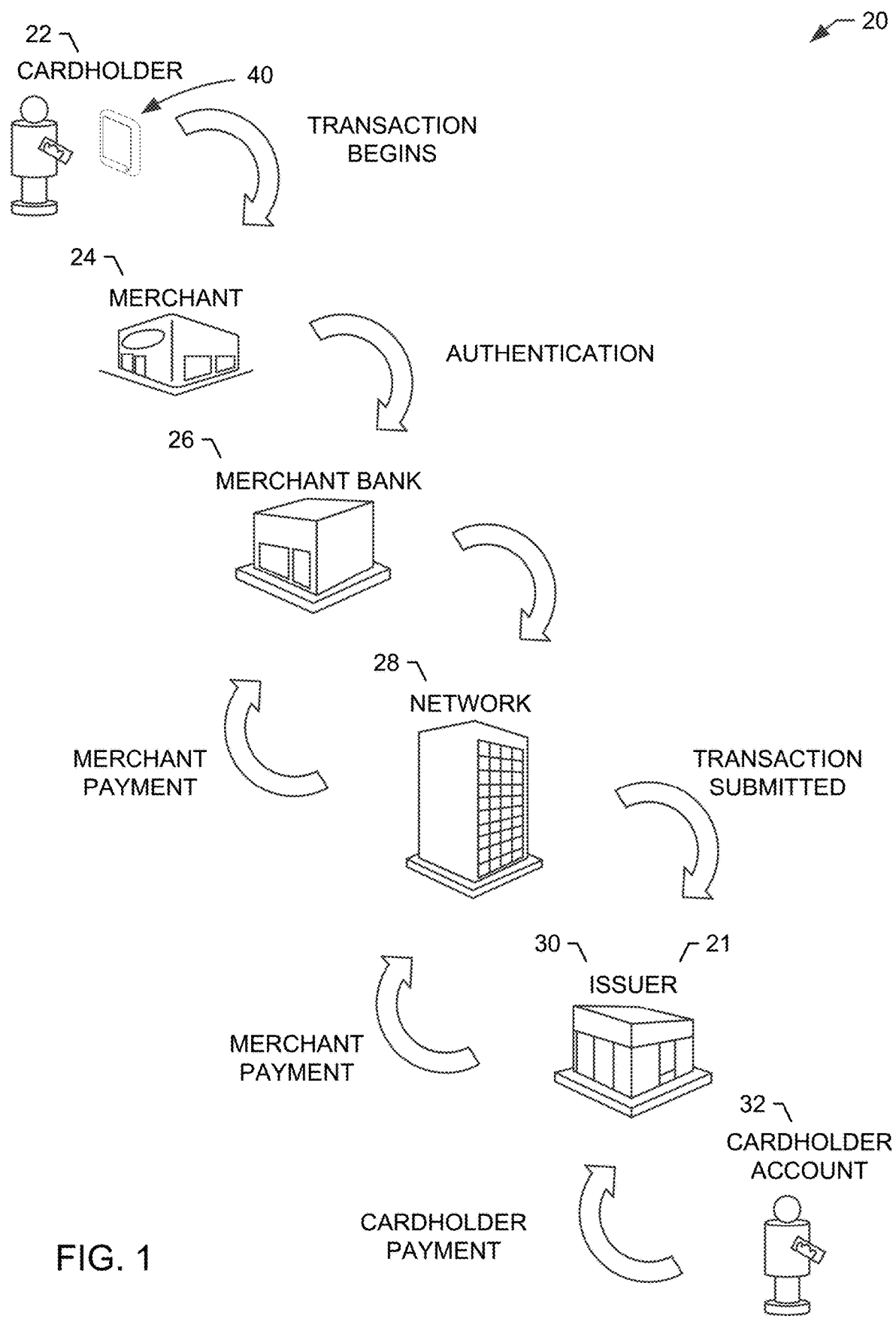
FIG. 1 is a schematic diagram illustrating an example multi-party transaction card industry system for authorizing payment card transactions stored in the graph database.

The present disclosure relates to a merchant property graph database, and more specifically, to a graph component generator (GCG) computing device configured to identify relationships between disparate points in a graph database populated with merchant, cardholder, and transaction data. Cardholders may include any holders of payment cards or payment card accounts issued by, for example, an issuing bank. Merchants include any persons with physical or online stores offering goods or services for sale. In the exemplary embodiment, transaction data generated from payment card transactions between merchants and cardholders (and associated data related to merchants and cardholders) is converted from a relational database form (e.g., tables) into a graph database. Over time, the graph database is refreshed with updated data from the relational database. In other embodiments, transaction data is directly input into a graph database format without an intervening relational database.

In the exemplary embodiment, the graph database stores data in a graph structure, i.e., in the form of "nodes" and "edges" that connect the nodes. A node (also known as a vertex) is a point in the graph that represents a connected entity including one or more data points called "attributes" (also known as properties). In at least some implementations, each attribute is stored as a key-value pair (e.g., "name: Tasty Subs", "type: Merchant", "subtype: Restaurant", etc.). A node can represent a single entity or an aggregate entity comprising many sub-entities. Nodes can be tagged with one or more "labels," which can be used to group nodes together.

In the exemplary embodiment, an edge defines a link, relationship, or connection between two nodes. Depending on the attributes of two nodes, different edges may be formed between the nodes. Edges may be labeled similarly to nodes. In one embodiment, edges represent a directed relationship between two nodes. For example, a cardholder's transaction with a merchant may be represented by an edge labeled "IS_CUSTOMER_OF" directed from the cardholder to the merchant. Edges may also be undirected. For example, if two nodes have a common value for a particular attribute, an edge may be formed between the nodes representing the commonality.

The merchant property graph database includes nodes representing at least merchants and cardholders, and edges representing relationships among the merchants and cardholders. There may also be aggregate nodes representing groups of nodes, i.e., a set of merchants or cardholders grouped together due to common ownership, geography, and the like. In at least some implementations, each node is labeled and includes attributes related to the represented entity that are stored as key-value pairs.

In at least some implementations, the graph database is stored on a computing device that is in communication with one or more computing devices associated with a payment processor. A payment processor computing device is, in some embodiments, part of a larger payment processing network that may include computing devices associated with merchants, issuing banks, acquiring banks, and other transaction services providers. The payment processor processes transactions that cardholders perform at merchant locations using payment cards issued to the cardholders. Transaction data is generated as a result of each transaction including, for example, transaction date, transaction time, merchant name or other identifier, and payment card details (card number, expiration date etc.). In one embodiment, the payment processor stores transaction data in a relational database (e.g., in the form of tables with columns for data types and rows for individual data records). The relational database is stored on database computing devices that are in communication with the payment processing network. In at least some implementations, transaction data is converted from the relational database into the merchant property graph database. In one embodiment, a graph component generator (GCG) computing device is in communication with the graph database and thus has access to transaction data received from the payment processor. In another embodiment, the GCG computing device is a member of the payment processing network and has direct access to transaction data through the payment processing network computers as well as from the graph database.

In one embodiment, conversion of the transaction data from the relational database into the graph database involves first representing each table in the relational database as a label. The GCG computing device converts each row in the table into a node in the graph database and labels it as appropriate. Each column in the table is converted into an attribute of the node. For example, a Cardholders table in the relational database may be converted into a series of nodes, each node labeled "Cardholder." Then each node represents a cardholder in the table. For example, row 1 contains data about a cardholder (e.g., a primary account number, or PAN) with corresponding columns holding additional data (e.g., issuing bank, card type/product type etc.). This converts to a node for the PAN, labeled Cardholder, with attributes in the form of key-value pairs for each of the PAN, issuing bank, card type/product type, first seen date etc. for this cardholder. Based on user preferences, the GCG computing device also generates aggregate nodes based on geographical region, merchant category, card segment, or even by payment processing network service. For example, there may exist nodes labeled "All Wal-Mart Stores in St. Louis," "All Sporting Goods Stores," "All Cardholders using Payment Network A," "All Cardholders using Payment Network Service B," and the like. In at least some implementations, the GCG computing device also organizes geographical region nodes hierarchically, such as by country, state, city, etc.

In some embodiments, the relational database tables are "joined" to each other using database join operations that link rows from separate tables based on a common column or field between them. The GCG computing device is configured to convert any join relationships existing between tables into edges in the graph database. For example, where the Cardholder table is joined to the Merchants table, the GCG computing device converts this join relationship into an edge for each cardholder connecting to each merchant that the cardholder has visited. Furthermore, a cardholder, for example, may have visited a merchant called Metro Toy Store. Accordingly, a node labeled "Metro Toy Store" is created with attributes such as merchant ID: M0001, name: Metro Toy Store, location: 123 Main Street, any aggregate merchants to which the merchant node is related or connected (e.g., Big Toy Corp.), and transaction data for transactions that took place at the merchant's location. The GCG computing device creates an edge from The Metro Toy Store node directed to the PAN node for that cardholder, wherein the edge is labeled "IS_VENDOR_OF" and may have attributes such as "transactioncount: 6," transactionamount: $300," firsttransaction: 20150520/09:00" and the like. In other embodiments, the GCG computing device creates an edge from the PAN node for that cardholder directed to Metro Toy Store labeled "IS_CUSTOMER_OF" with the aforementioned attributes. In still other embodiments, both edges may be created between the card PAN node and Metro Toy Store, or a single undirected edge may be created labeled, for example "TRANSACTIONS."

In at least some implementations, transaction data generates a plurality of relationships in the graph database as described above. However, it is difficult or impossible to detect relationships between otherwise unconnected nodes. For example, given a particular merchant node, it is difficult to determine relationships such as "other merchants my cardholders visit," or given a particular cardholder, "recommended merchants that cardholders like me should visit." Converting the transaction data from a relational database form into a graph database enables an efficient determination of many new relationships and connections.

Accordingly, the GCG computing device is configured to generate new edges that exist between nodes in the graph database based on identifying features or commonalities that exist among the nodes. Converting the transaction data from the relational database form into a graph database creates a number of edges. The GCG computing device is configured to use this existing relationship data together with data associated with each point in the graph and generate new edges. In at least some implementations, the GCG computing device is configured to receive a part of the graph database, including a plurality of nodes and edges. The GCG computing device also receives user input defining the sort of commonalities or patterns that are of interest to a user. For example, a user may wish to know of a merchant A that shares cardholders X with a particular merchant B, and also may wish to know of cardholders Y of merchant A. The GCG computing device is configured to receive the user's query as input and traverse the graph database to search for the merchants A and B matching the query.

Upon determining merchants A and B, the GCG computing device traverses edges from both merchant nodes to all connected cardholder nodes. Having retrieved all connected cardholders, the GCG computing device filters out cardholder nodes that have edges to both merchants A and B, and returns these cardholder nodes as cardholders X to the user. Additionally, the GCG computing device is configured to generate an edge between merchant A and merchant B. The GCG computing device is also configured to generate an edge between merchant B and cardholders Y. The GCG computing device also generates a label for each edge. For example, the merchant A—merchant B edge may be labeled "CO_VENDOR." The merchant B—cardholders Y edge may be labeled "RELATED_CARDHOLDERS." The GCG computing device is also configured to generate attribute values for each edge, derived from the attributes of the nodes involved. For example, the "CO_VENDOR" edge may have attributes such as "total transactions by cardholders X," derived from all transactions by cardholders X that took place at both merchants A and B. The GCG computing device is configured to update the graph database with these newly created edges.

In addition to generating edges, the GCG computing device is also configured to generate nodes that may not arise out of the transaction data. For example, the transaction data results in nodes for merchants and cardholders, but the GCG computing may generate new nodes e.g., "Most Visited Restaurants on Fridays in St. Louis," "All Cardholders Visiting Restaurant A and Movie Theater B," and the like.

Additionally, the GCG computing device is configured to generate useful data based on the generated edges. For example, using the "total transactions by cardholders X" attribute, the GCG computing device is configured to generate "co-visit" and "sequence of visit" data. Those skilled in the art will appreciate that many other edges may be generated using the transaction data, such as "cardholders-of-merchants-who-vend-to-my-cardholders," "merchants-who-vend-to-cardholders-of-merchants-who-vend-to-my-cardholders," and so on.

In at least some implementations, co-visit data refers to transaction data for instances where a cardholder transacts with two or more merchants in a predetermined period of time, such as within the same hour, on the same day, or in the same month or payment card billing cycle. The GCG computing device is configured to receive query input regarding such co-visits and generate an edge between two or more merchants labeled, for example, "CO_VISITED." Transactions within this period of time are termed "co-visit transactions" and are useful to provide insight into, for example, goods and services that cardholders like to buy together.

In at least some implementations, sequence of visit data refers to transaction data for instances where a cardholder transactions with two or more merchants in a specified order or sequence. For example, a cardholder may always visit a particular restaurant, followed by a particular movie theater, in that order. The GCG computing device is configured to receive query input regarding such sequences and create, for example, a directed edge between two or more merchants. The edge may be directed from the merchant visited first to the merchant visited second and labeled, for example "IS_VISITED_BEFORE" or directed oppositely and labeled "IS_VISITED_AFTER."

In at least some implementations, the GCG computing device is configured to present part of the graph database as an abstraction. It may be desirable, for example, to view only cardholder nodes, or only merchant nodes, or only merchant nodes that are linked via co-visit edges. In at least some implementations, the GCG computing device is configured to retrieve data regarding its generated edges. For example, a user may query the GCG computing device for all merchants that are co-visited. The GCG computing device is configured to traverse the entire graph and return a list of all edges labeled "CO_VISIT" and associated merchants, based on input requirements such as co-visits within a certain geography or timeframe.

In other implementations, the GCG computing device is configured to automatically generate all possible edges matching specific criteria whenever new data is added to the graph, rather than at query time as has been described above. For example, when a new cardholder is added to the graph database, the GCG computing device is configured to query the attributes associated with the cardholder, including transaction data for the cardholder. The GCG computing device is configured to automatically generate edges (e.g., IS_CUSTOMER_OF) between the cardholder and all merchant nodes based on each transaction in the transaction data. Those having skill in the art will appreciate that addition of a new cardholder and transaction-data based edges may result in the GCG computing device generating new edges related to co-visits and sequence of visits. For example, the GCG computing device may detect that the newly added cardholder node has IS_CUSTOMER_OF edges connecting it to two particular merchants, and the GCG computing device may determine that the cardholder has visited the merchants within, for example, the same day in the past. If so, the GCG computing device is configured to generate a new CO_VISIT edge between the two merchants, where none may have previously existed. As noted earlier, users of the GCG computing device may then retrieve this new CO_VISIT edge and associated merchants in order to gain useful knowledge about which merchants are visited together.

In at least some implementations, the GCG computing device is configured to prioritize certain edges over others, at least by giving certain edges a higher weight value than others. A weight value is an attribute of the edge that can be a numerical value, a percentage, or any valuation on a spectrum (colors, letter grades, etc.) allowing the GCG computing device to prioritize edges by weight. In the exemplary embodiment, the weight value represents frequency of transactions. For example, a merchant may have participated in ten transactions with cardholder 1 but fifteen transactions with cardholder 2. Accordingly, GCG computing device the merchant-cardholder 2 edge labeled IS_CUSTOMER_OF is given a higher weight value than the corresponding merchant-cardholder 1 edge.

In other embodiments, the GCG computing device is configured to prioritize newer edges more than older ones. For example, the GCG computing device uses a weighted sum given by $S_n = qC_n + (1-q)S_{n-1}$ where the transaction count on day n is $C_n$, the weighted sum up to day n−1 is $S_{n-1}$, and q is a weighting factor that is between 0 and 1. Where a value of q is higher, $C_n$, i.e., more recent transactions, will be given greater weight in determining edges, compared to $S_{n-1}$ i.e., older transactions.

The GCG computing device is configured to be put to a number of applications that are enabled based on the edge- and node-generation functions of the GCG computing device described above. In one embodiment, the GCG computing device is configured to provide recommendations tailored to a particular user. For example, if cardholders C1 and C2 both like to shop at merchants M1 and M2, and C1 also likes to shop at M3, then it is likely that C2 also likes M3. In such a case, the GCG computing device is configured to generate an edge between C2 and M3, and present the C2-M3 edge to a user for purposes of providing recommendations for M3 to the cardholder C2.

In other embodiments, the GCG computing device can also be put to target marketing uses. For example, if a merchant M1 has customer C1 and M2 has customers C1 and C2, M1 may wish to send promotional offers to C2 as well since it is likely C2 has similar taste with C1. Accordingly, the GCG computing device generates an edge between M1 and C2 and presents this new edge to a user of the system for purposes of providing marketing strategies to the merchant M1. In another embodiment, the GCG computing device may employ "sequence of visit" data, but in a reversed order this time. Where sequence of visit data reveals that cardholders visit a specific merchant only after visiting specific other merchants, the latter merchant may wish to collaborate or cross-promote with merchants visited before it.

In still further embodiments, the GCG computing device may be configured to find potential merchants to register for particular services provided by a payment processing network. For example, a merchant M1 may sign up for a particular payment processing network service and the graph database may reveal that the service improved the merchant's business, e.g., in the form of increased sales. If so, another merchant M2 who shares customers with M1 may be a good candidate for the same payment processing network service. Accordingly, the GCG computing device may return one or more merchants who share customers with M2 to a user to provide to a payment processing network in order to improve uptake of the service.

In additional embodiments, the GCG computing device is configured to assist in account data compromise (or fraud) detection. For example, a plurality of cardholders may report an incidence of fraud, identity theft, or other loss (e.g., to the issuing bank that issued the cards or to the affiliated payment processing network). The GCG computing device is configured to traverse the graph database using nodes of those cardholders as input and attempt to locate a single node or group of nodes that all cardholders have in common. For example, all the cardholders that have reported fraud may have transacted with a particular merchant. Using the GCG computing device to traverse the graph database can quickly reveal the specific merchant as a possible source of the incidences of fraud.

The GCG computing device may also function as an anti-recommender. For example, the transaction data may reveal a cardholder's transaction with a new or unfamiliar merchant. The GCG computing device may be configured to traverse the graph database and determine whether the distance between the cardholder and merchant nodes in the graph database exceeds a predetermined threshold. This threshold represents a likelihood that the cardholder would have transacted with that merchant. For example, if the nodes for this cardholder and other cardholders with similar transaction history would require a large number of traversals to reach the merchant node, then it may be indicative that the transaction is fraudulent because the cardholder may not have voluntarily transacted with this merchant. For example, the merchant may be in a foreign country, or of a type the cardholder normally never visits, etc.

At least one of the technical problems addressed by this system includes difficulty or inability of detecting interrelationships between disparate merchants and cardholders using relational databases. Relational databases typically store data in two-dimensional (row-column) tables which enable fast retrieval of data from within the table but no visibility to data outside a particular table. Detecting connections or relationships between data in separate tables requires table join operations, which quickly become cumbersome to code. Worse still, with each successive join operation, system performance declines precipitously. With payment card transaction tables in the size of billions of rows and with millions of merchants and cardholders, it becomes incredibly slow and difficult to determine, for example, relationships that are more than one or two degrees from a source merchant or cardholder. Another technical problem is the inability of analyzing an isolated section of the relational database without first engaging in complex join and filter operations.

The methods and systems described herein may be implemented using computer programming or engineering techniques including computer software, firmware, hardware, or any combination or subset thereof, wherein the technical effects may be achieved by performing at least one of the following steps: (a) receiving transaction data from a relational database, wherein transaction data is derived from transactions, processed by a payment processor, between at least a first merchant of a plurality of merchants and a first cardholder of a plurality of cardholders, (b) defining a graph including creating at least a first node representing at least the first merchant and a second node representing the first cardholder, (c) identifying at least one relationship between at least two nodes including the first node and the second node in the graph based, at least in part, on transaction data that is common to the at least two nodes, and (d) generating at least one edge between the at least two nodes, representing a new relationship between the at least two nodes.

The resulting technical benefits achieved by this system include at least one of: (i) fast and efficient searching of transaction data to retrieve specific cardholders and merchants based on their interrelationships, (ii) ability to detect new relationships (e.g. co-visit, sequence of visit) between cardholders and merchants, between merchants and merchants, etc. (iii) ability to generate recommendations for cardholders, merchants, and even payment processing networks, and (iv) ability to efficiently detect fraud.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to financial transactions in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party transaction card industry system 20 for authorizing payment card transactions which are stored in the graph database and retrieved using the GCG computing device. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to the consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." Cardholder 22 tenders payment for a purchase using a transaction card, then merchant 24 requests authorization from a merchant bank 26 for the amount of the purchase. The request may be performed over the telephone, but is usually performed through the use of a point-of-sale terminal, which reads cardholder 22's account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder 22's account 32 is in good standing and whether the purchase is covered by cardholder 22's available credit line. Based on these determinations, the request for authorization will be declined or accepted. If the request is accepted, an authorization code is issued to merchant 24.

When a request for authorization is accepted, the available credit line of cardholder 22's account 32 is decreased. Normally, a charge for a payment card transaction is not posted immediately to account 32 of cardholder 22 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

Database 120 may store transaction data generated as part of sales activities and savings activities conducted over the processing network including data relating to merchants, cardholders or customers, issuers, acquirers, and/or purchases made. In one embodiment, database 120 stores transaction data in relational database form, i.e., in the form of multiple two-dimensional tables. Each table may comprise rows and columns, with rows holding individual records and columns storing individual data points for each record (e.g., for a merchant record, merchant ID, name, address, etc.).

Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, cardholder 22, merchant 24, merchant bank 26, interchange network 28 (also referred to herein as payment processor 28), issuer bank 30, and/or an issuer processor 21.

Further, the interchange network 28 may collect and store transaction data for payment card transactions in an internal database, such as a graph database. A GCG computing device analyzes the graph database, generates graph components (nodes and edges), and enables particular services such as recommendations and fraud detection for a cardholder (e.g., cardholder 22) and/or a merchant (e.g., merchant 24).

Figure 2:
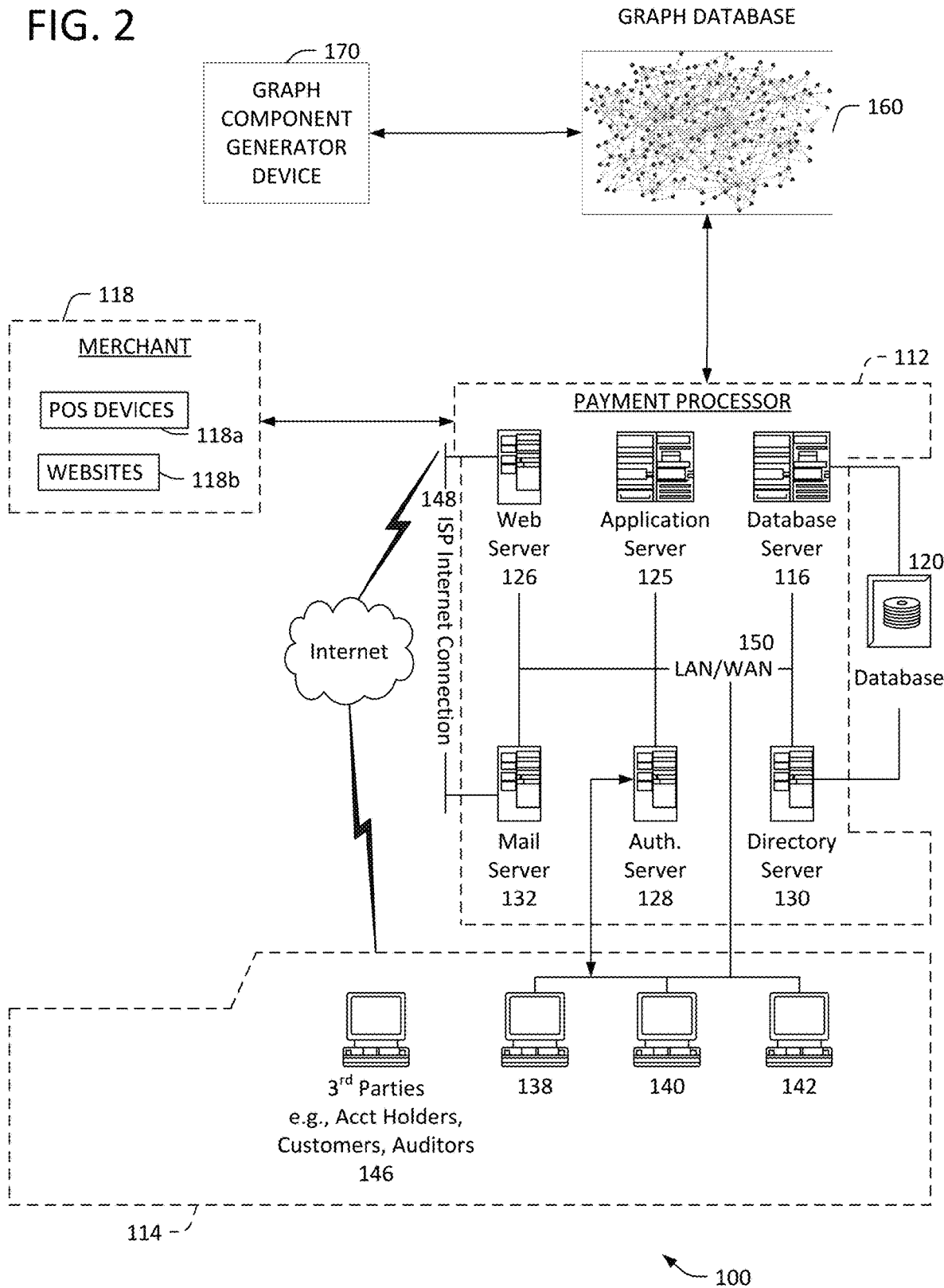
FIG. 2 is a simplified block diagram of an example environment 100 including an example graph component generator (GCG) device and associated graph database.

FIG. 2 is a simplified block diagram of an example environment 100 including an example graph component generator device and associated graph database. Environment 100 shows a graph component generator (GCG) computing device 170. GCG computing device 170 is in communication with at least one graph database 160, and a payment processor 112. In the exemplary embodiment, GCG computing device 170 is configured to at least perform create, read, update and delete operations on transaction data stored in a graph database. In one embodiment, GCG computing device 170 is a member of or part of payment processor 112. In another embodiment, GCG computing device 170 is external to and/or in communication with payment processor 112.

In one embodiment, payment processor 112 is in communication with merchant computing devices 118. Merchant computing devices include point-of-sale (POS) devices 118a and websites 118b. POS devices 118a include any devices designed to receive account data transmitted during a transaction. Merchants also operate websites 118b where cardholders may visit and purchase goods and services using computing devices similar to user computing device 170 which will transmit to websites 118b. In one embodiment, a merchant's brick-and-mortar location and website(s) are represented by individual nodes in graph database 160. In another embodiment, the brick-and-mortar location and website are represented by a single node.

In one embodiment, payment processor 112 represents a group of interconnected computers that includes database server 116, application server 125, web server 126, mail server 132, authentication server 128, and directory server 130, all in communication over a LAN/WAN network 150. In the exemplary embodiment, payment processor 112 communicates with external computers via internet connection 148. Authentication server 128 communicates with remotely located systems, e.g., user computing device 170. Authentication server 128 is also configured to communicate with other workstations 138, 140, and 142 as well.

Payment processor 112 is also in communication with computers 114 that, in the exemplary embodiment, are associated with issuing banks that issue payment cards to cardholders and/or acquiring banks that hold accounts for merchants. Computers 114 are interconnected to the network through many interfaces including a network 115, such as a local area network (LAN) or a wide area network (WAN), dial-in-connections, cable modems, special high-speed Integrated Services Digital Network (ISDN) lines, and RDT networks. Computers 114 could be any device capable of interconnecting to the Internet including a mobile device, desktop or laptop computer, or other web-based connectable equipment. In one embodiment, payment processor 112 communicates transaction data to and from computers 114.

A database server 116 is connected to database 120, which contains information on a variety of matters, as described below in greater detail. In one embodiment, database 120 is stored on payment processor 112 and can be accessed by potential users of payment processor 112 or GCG computing device 170. In an alternative embodiment, database 120 is stored remotely from payment processor 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, cardholders or customers, issuers, acquirers, and/or purchases made. In one embodiment, database 120 stores transaction data in relational database form, i.e., in the form of multiple two-dimensional tables. Each table may comprise rows and columns, with rows holding individual records and columns storing individual data points for each record (e.g., for a merchant record, merchant ID, name, address, etc.). In some embodiments, the relational database tables are "joined" to each other using database join operations that link rows from separate tables based on a common column or field between them.

Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data.

In the example embodiment, one of computers 114 may be associated with an acquirer bank while another one of computers 114 may be associated with issuer bank 30 (shown in FIG. 1). Computers 114 may comprise third party computers 146, and issuer devices 138, 140, and 142. In the example embodiment, payment processor 112 is associated with an interchange network, such as interchange network 28, and may be referred to as an interchange computer system or a payment processing computing device. Payment processor 112 may be used for processing transaction data. In addition, computers 114 may include a computer system associated with at least one of an online bank, a bill payment outsourcer, an acquirer bank, an acquirer processor, an issuer bank associated with a transaction card, an issuer processor, a remote payment system, a token requestor, a token provider, and/or a biller.

In the example embodiment, GCG computing device 170 does not consist of generic computer hardware, nor does it require merely generic computer instructions to perform the above functions. Rather, GCG computing device 170 is a specific and customized computer device built to perform the specific function of manipulating data stored in a graph database and generate new relationships between graph database nodes that are not evoked by transaction data populating the graph database. In the example embodiment, GCG computing device 170 is configured to communicate in specific ways with graph database 160 and payment processor 112. GCG computing device 170 is specifically configured to perform one or more of the data manipulation tasks described herein, such as receiving transaction data from a relational database, wherein transaction data is derived from transactions, processed by a payment processor, between at least a first merchant of a plurality of merchants and a first cardholder of a plurality of cardholders, defining a graph including creating at least a first node representing at least the first merchant and a second node representing the first cardholder, identifying at least one relationship between at least two nodes including the first node and the second node in the graph based, at least in part, on transaction data that is common to the at least two nodes, and generating at least one edge between the at least two nodes, representing a new relationship between the at least two nodes.

Figure 3:
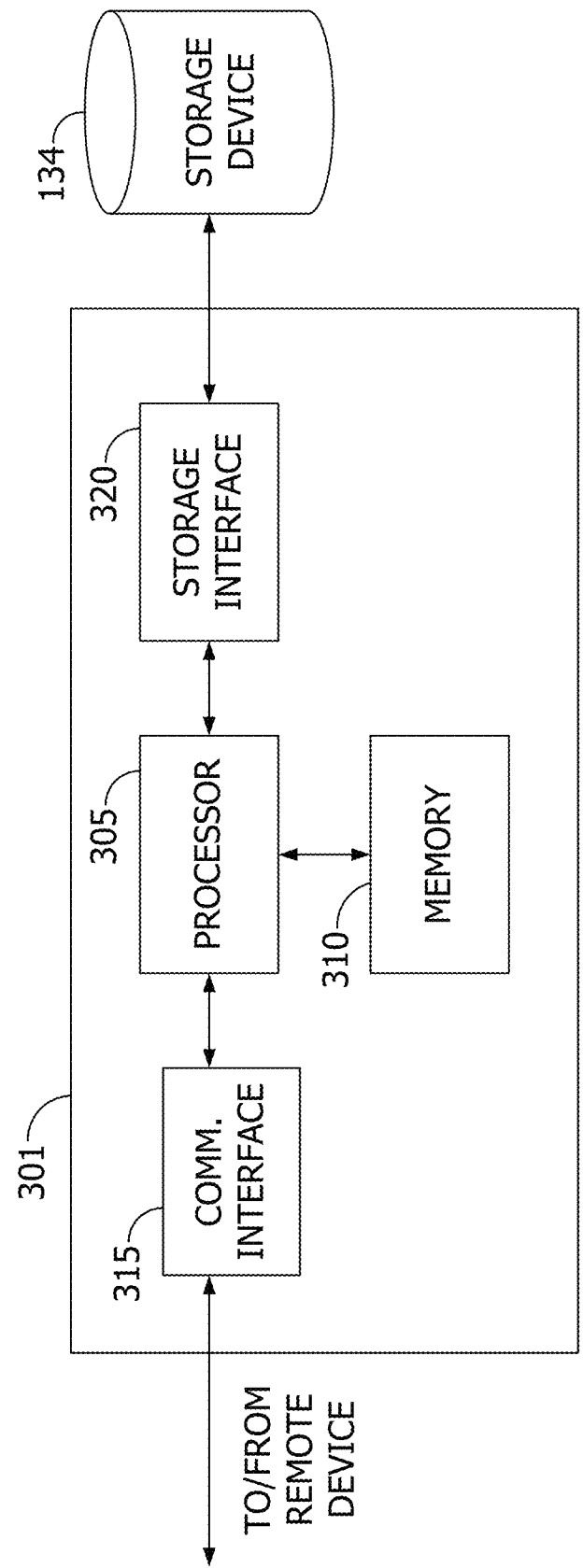
FIG. 3 illustrates an example configuration of a server system such as GCG computing device 170 shown in FIG. 2 used for generating and maintaining links in a graph database.

FIG. 3 illustrates an example configuration of a server system such as GCG computing device 170 shown in FIG. 2 used for generating and maintaining links in a graph database. Server system 301 may include, but is not limited to, database server 116, graph database 160, or GCG computing device 170 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, Python, JavaScript, or other suitable programming languages, etc.).

Processor 305 is operatively coupled to a communication interface 315 such that server system 301 is capable of communicating with a remote device such as a user system or another server system 301. For example, communication interface 315 may communicate with merchant computing devices 118 and computers 114 via the Internet, as illustrated in FIG. 2.

Processor 305 may also be operatively coupled to a storage device 134, similar to database 120 in FIG. 2. Storage device 134 is any computer-operated hardware suitable for storing and/or retrieving data. In some embodiments, database 120 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
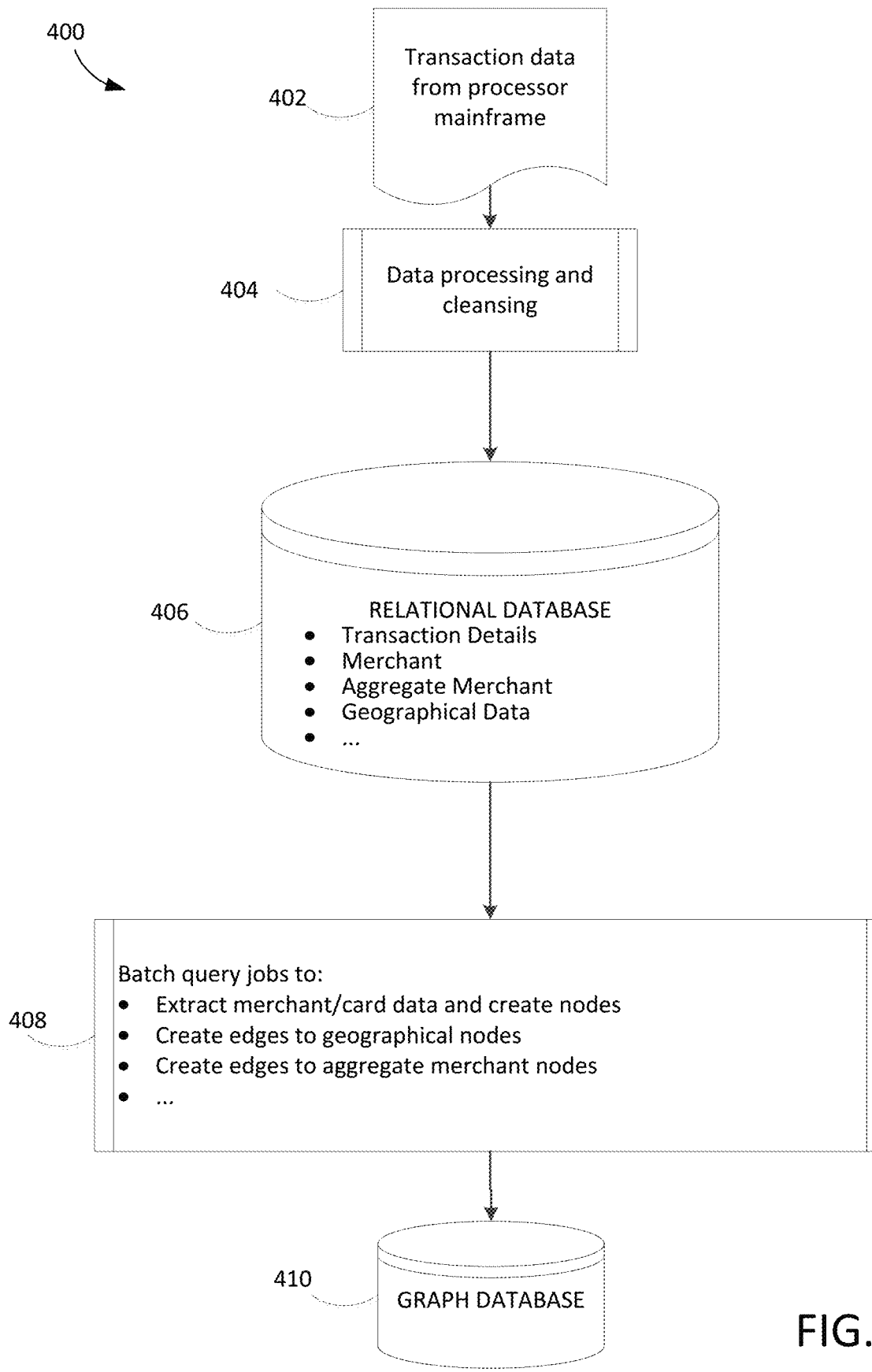
FIG. 4 illustrates an exemplary data flow 400 by which data from payment card transactions is converted into a graph database format.

FIG. 4 illustrates an exemplary data flow 400 by which data from payment card transactions is converted into a graph database format. In the exemplary embodiment, GCG computing device 170 is configured to directly receive transaction data from, for example, payment processor 112 (shown in FIG. 2) and convert it into graph database form. In another embodiment, payment processor 112 converts incoming transaction data into graph database form for further manipulation by GCG computing device 170. At 402, transaction data is received from, for example, merchant computing devices 118. At 404, the transaction data is processed and subjected to cleansing operations (e.g., removing duplicates, removing erroneous data, flagging transactions for review by other computing devices, etc.).

At 406, transaction data is stored in a relational database form including various data tables. For example, a transaction details table including transaction date, time, location, amount, payment card type, cardholder information, and the like. A merchant table holds merchant records including merchant identifier, name, address, transaction volume, transactions performed at this merchant, and related information. An aggregate merchant table holds aggregate merchant data including lists of merchants that, for example, are affiliated with larger corporations, merchant groups, or franchises. The aggregate merchant table may also list merchants by geographical location, usage of payment processing network services, payment card type(s), and the like. A geographical data table holds physical location information for merchants, ATMs, and other entities involved in transactions for which data is received. Those having skill in the art will appreciate that the abovementioned tables are not a definitive or exhaustive list. The exemplary relational database at 406 may store data in many other configurations and may store many other types of data. Additionally, the abovementioned and other tables may be joined to each other via common fields such as primary keys, foreign keys, and the like.

At 408, the GCG computing device executes a number of batch jobs extract data from the relational database to convert into graph database form. In one embodiment, a batch job is any collection of computer-executable instructions that are periodically executed on the relational database to extract and manipulate the data. These include batch jobs to extract merchant and card data and generate graph nodes for each merchant or each card or cardholder. Also included are batch jobs creating edges or links between geographical nodes and merchant and cardholder nodes. Further included are batch jobs creating edges to aggregate merchant nodes. Those having skill in the art will appreciate that the number and quality of batch jobs will vary with the complexity and amount of relational database data being converted to graph database form. As such, multiple other batch jobs (not shown) may be employed to perform the conversion into the graph database at 410.

Figure 5:
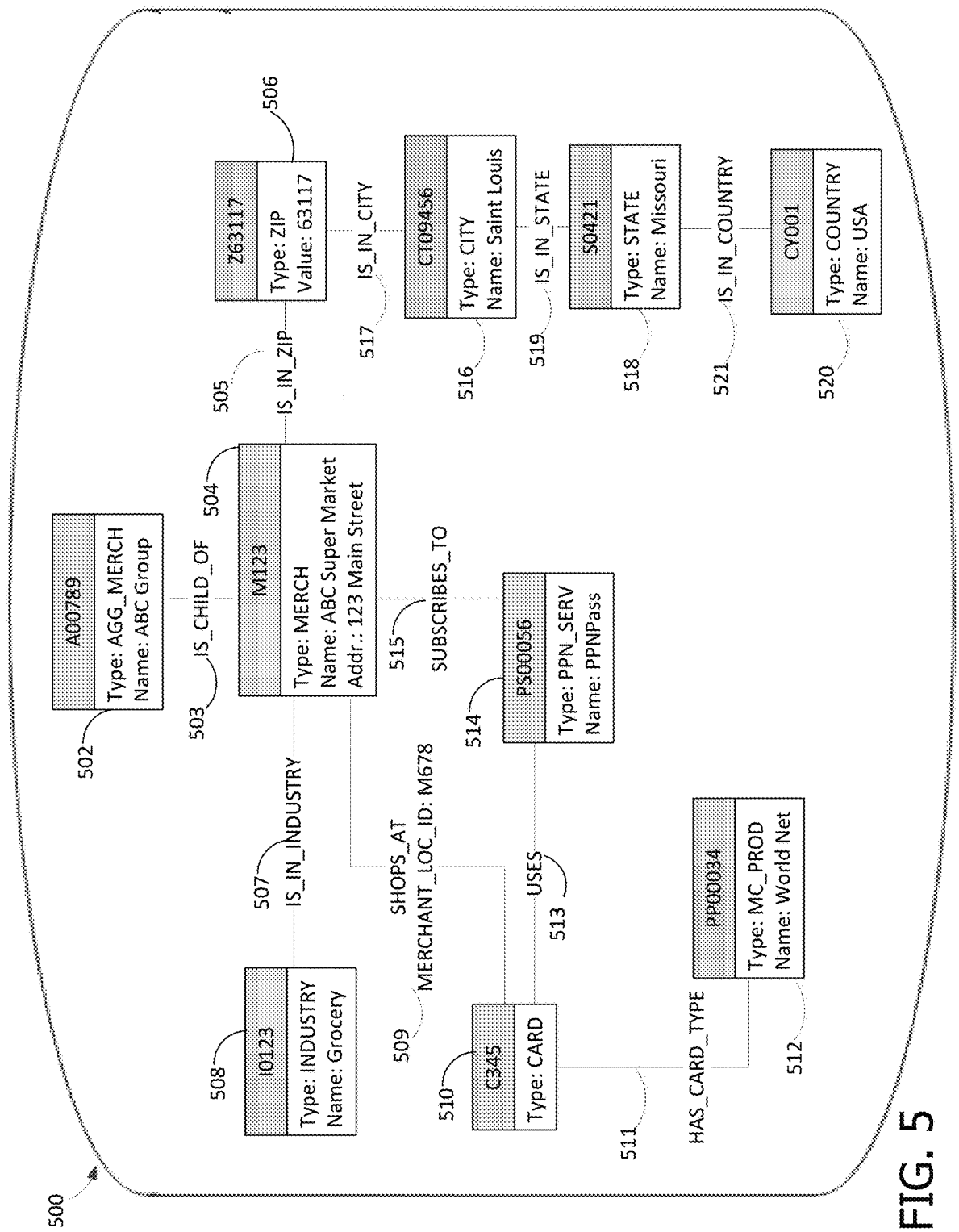
FIG. 5 illustrates an exemplary configuration 500 of transaction data converted into graph database form.

FIG. 5 illustrates an exemplary configuration 500 of transaction data converted into graph database form. The displayed nodes are interconnected via a number of labeled edges, which may be directed or undirected. As shown, a merchant node 504 labeled M123 is connected to a number of other nodes. Merchant node 504 also holds attributes such as node type (merchant), name (ABC Super Market), and address (123 Main St.). As shown, a merchant node 504 is connected to an aggregate merchant node 502, via an edge 503 labeled IS_CHILD_OF, denoting that merchant node 504 is a subsidiary node of aggregate merchant node 502 which may be node representing a larger corporation or parent company (ABC Group). Merchant node 504 has an edge 507 labeled IS_IN_INDUSTRY connecting merchant node 504 to industry node 508, with attribute of Name: "Grocery," indicating that merchant node 504 represents a grocery merchant, (e.g., a vegetable market). Merchant node 504 subscribes to payment processing network service PPNPass, and this is indicated via edge 515 labeled SUBSCRIBES_TO to payment processing network service node 514, with name attribute PPNPass.

Merchant node 504 also has an edge 509 labeled SHOPS_AT connecting to card node 510 labeled C345, indicating that a cardholder has used C345 at least once at merchant M123. Edge 509 has another attribute MERCHANT_LOCATION_ID: M678, denoting the older merchant location identifier for merchant M123. Card node 510 further connects via edge 511 labeled HAS_CARD_TYPE to a payment processing network product node 512, with attribute of name: WorldNet, indicating the card type for the payment card represented by card node 510. Card node 510 also connects to payment processing network service node 514 with edge 513 labeled USES, indicating that the payment card represented by card node 510 uses PPNPass as well.

Merchant node 504 further has an edge 505 labeled IS_IN_ZIP to zip node 506, which in turn has attribute 63117, indicating that merchant M123 is located in at least the 63117 zip code. Zip node 506 further has an edge 517 labeled IS_IN_CITY to city node 516 (name value: St. Louis). City node 516 connects via edge 519 labeled IS_IN_STATE to state node 518 (name value: Missouri). State node 518 connects via edge 521 labeled IS_IN_COUNTRY to country node 520 (name value: USA).

Merchant data is not consistent over time. Occasionally, a new location identifier might be assigned to an 'existing' merchant if data arrives in differently (e.g., if the merchant changed its acquiring bank, modified its D/B/A name, or modified its address etc.). In some embodiments, the payment processor maintains a mapping among location identifiers if one merchant is later identified to be an existing merchant. This process maps the transactions at the 'new merchant' to a 'master merchant'. The location identifier assigned to the 'new merchant' may be termed 'old location identifier', and the location identifier of the merchant which all transactions are mapped to, is called 'master location identifier'. Initially all new merchants are considered 'master merchants' until they are mapped to an existing 'master merchant'.

In a graph database, cardholders are connected via edges to master merchants, but a 'new merchant' may later be mapped to an existing master merchant. In one embodiment, an attribute named "MERCHANT_LOCATION_ID" is stored within the edges between a cardholder node and a merchant node. Consider the example that a transaction occurred between merchant M678 and Card C345, and then the merchant M678 is 'mapped' to M123. Initially a node M678 is created, and a link between C345 and M678 is created, with attribute MERCHANT_LOCATION_ID= 'M678'.

After merchant M678 is transferred to M123, the link between C345 and M678 is deleted, and a new link between C345 and M123 is created (or updated). The properties of the link, including transaction details as well as 'MERCHANT_LOCATION_ID', will remain unchanged. In this way, location mappings are tracked and can be rolled back using data from the MERCHANT_LOCATION_ID attribute.

In another embodiment, the mapping can be achieved by connecting the older merchant location node to the master merchant node with an edge of type "MERCHANT_MAPPING." In this example, there is no change of relationship between C345 and M678, but M678 is linked to M123 with a "MERCHANT_MAPPING" edge. This embodiment facilitates merchant mapping (because a change of only one link is required), but at the cost of query complexity.

Figure 6:
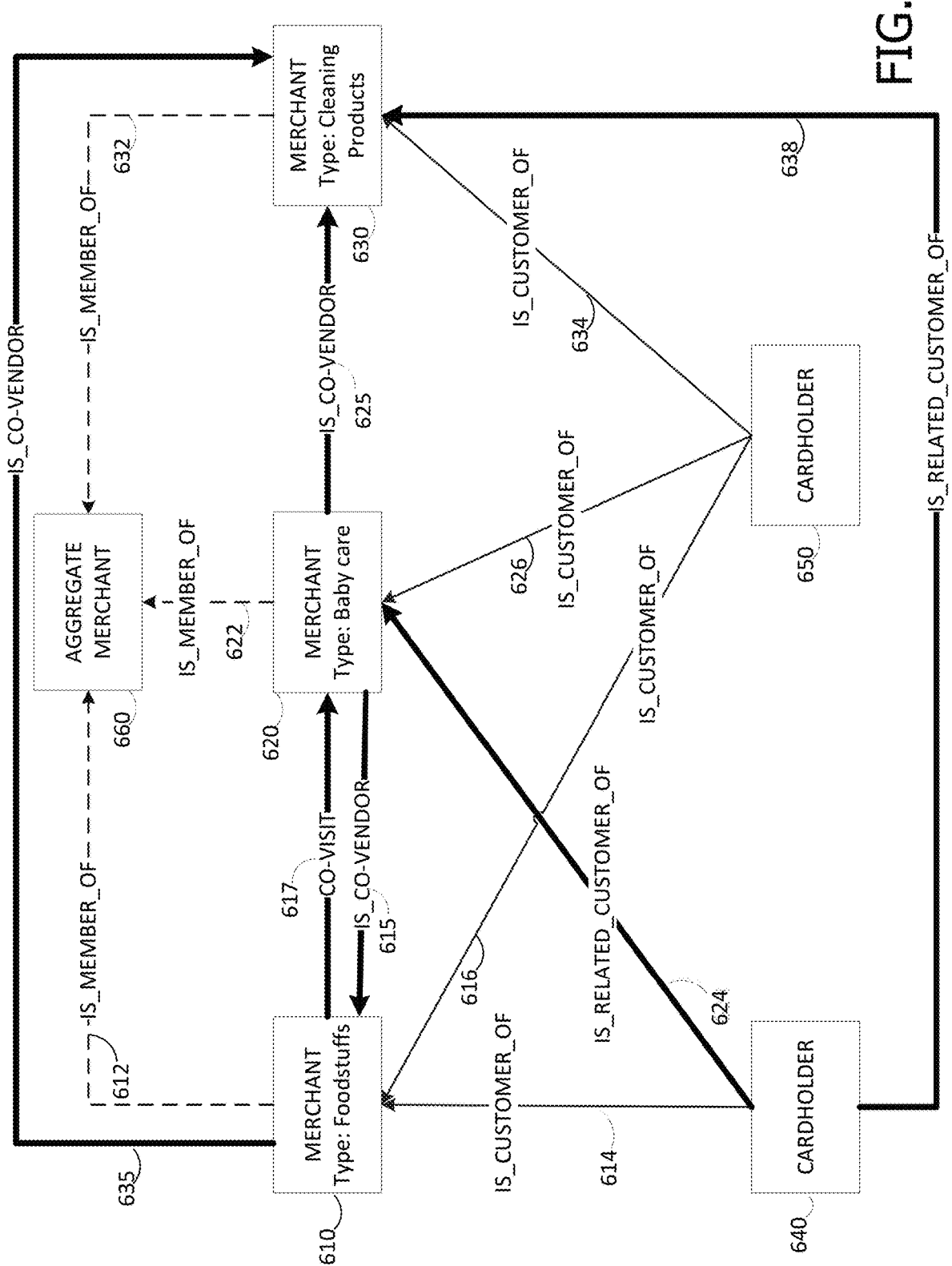
FIG. 6 shows an exemplary configuration 600 of nodes in the graph database, with certain edges generated by the GCG computing device.

FIG. 6 shows an exemplary configuration 600 of nodes in the graph database, with certain edges generated by the GCG computing device. In one embodiment, configuration 600 represents the sum total of all transaction data received. In another embodiment, configuration 600 is a subset of the entire graph database. In yet another embodiment, configuration 600 is an abstraction of all or part of the actual graph database, such that only certain attributes (e.g., selected transaction data points) for particular nodes are used to determine the edges between them. An example of an abstraction would be a graph database model that shows nodes where transaction volume is only over a predetermined threshold, or nodes where transaction dates are in a particular range. This differs from a subset of the graph database, wherein a subset is simply a portion of the entire graph database, including all nodes, edges and attributes local to that portion.

The rectangular boxes each depict nodes in a graph database, with arrows depicting edges. In the following description, the entity represented by each node will be described as the actor in the relationship to avoid confusion between the entity itself and its corresponding node in the graph database. In one embodiment, merchant 610 connects to cardholder 640 via edge 614 labeled IS_CUSTOMER_OF, representing a vendor-client relationship based on one or more transactions between them. Transaction data from these transactions is at least stored in merchant 610 (i.e., the node representing merchant 610). In the exemplary embodiment, it is considered that cardholder 640 always purchases foodstuffs at merchant 610. Similarly, cardholder 650 connects to merchant 610 via edge 616 labeled IS_CUSTOMER_OF, and to merchant 620 via edge 626 labeled IS_CUSTOMER_OF. Cardholder 650 also always purchases foodstuffs at merchant 610, but visits merchant 620 to purchase baby care items. Additionally, cardholder 650 is connected to merchant 630 via edge 634 labeled IS_CUSTOMER_OF. In the exemplary embodiment, cardholder 650 buys laundry detergent from merchant 630.

Configuration 600 also shows aggregate merchant 660. Each of merchants 610, 620, and 630 connects to aggregate merchant 660 via edges 612, 622, and 632 respectively, labeled IS_MEMBER_OF. In the exemplary embodiment, the IS_MEMBER_OF edges represent that aggregate merchant 660 is a parent company of merchants 610, 620, and 630.

The edges described thus far (612, 614, 616, 622, 626, 632, 634) are developed directly from data received from the relational database as described in FIG. 4. The data from the relational database includes, as mentioned earlier, transaction data but also geographical data and data about merchant-aggregate merchant relationships. The remaining edges in FIG. 6 are generated by the GCG computing device. These generated edges represent relationships that are not obvious in a relational database (e.g., between two records in a relational database table) or are extremely difficult to evoke using queries (e.g., relationships that may require joining a large number of tables each containing millions of records). In the exemplary embodiment, the GCG computing device is configured to analyze the above data and discover the commonality between merchant 610 and merchant 620, i.e., the fact that cardholder 650 appears in transaction data for both merchants. The GCG computing device is configured to generate, between merchant 610 and merchant 620, an edge 615 labeled IS_CO_VENDOR. In one embodiment, edge 615 may have, as attribute(s), data about any cardholders common to merchant 610 and 620 (e.g., cardholder 650).

Similar to the generation process for edge 615, the GCG computing device detects that cardholder 650 has edges 626 and 634 to merchants 620 and 630 respectively. The GCG computing device then creates edge 625 labeled IS_CO-VENDOR between merchant 620 and merchant 630. In the same vein, GCG computing device detects that cardholder 650 has edges 616 and 634 connecting to merchants 610 and 630 respectively, and creates an edge 635 labeled IS_CO-VENDOR between merchant 610 and merchant 630. Based on edges 614, 616, and 634, the GCG computing device is configured to create another edge 638 labeled IS_RELATED_CUSTOMER_OF between cardholder 640 and merchant 630. And based on edges 614, 616, and 626, the GCG computing device creates an edge 624 labeled IS_RELATED_CUSTOMER_OF between merchant 620 and cardholder 640.

Edge 615, for example, enables the GCG computing device to generate recommendations. For example, now that merchant 610 and merchant 620 are in a "co-vendor" relationship, the edge 615 enables a user of the GCG computing device to discover merchant 620 while searching for merchant 610, and vice versa. Moreover, the user can grant merchant 610 access to information about customers of merchant 620 (e.g., cardholder 650). The converse is equally true, i.e. merchant 620 can access information about customers of merchant 610 (e.g., cardholder 640). Accordingly, the GCG computing device may recommend that merchant 610 offer baby care items to cardholder 650. In another embodiment, merchant 610 may provide attractive offers on foodstuffs to cardholder 650. Merchants 610 and 620 may enter into co-marketing campaigns and advertise products together to customers of both merchants. In another embodiment, cardholder 640 may be able to receive recommendations to visit merchant 630 for cardholder 640's cleaning needs.

In yet another embodiment, edge 615 may store aggregated transaction data as an attribute of its own (e.g., in the form of an array of historical data aggregated by day/month/year or an exponentially decayed average of the count/amount), featuring data for transactions at both merchant 610 and merchant 620. The GCG computing device may use transaction data stored within Edge 615 to determine that cardholder 650, for example, "co-visits" merchant 610 and merchant 620. In one embodiment, a co-visit is defined as a cardholder visiting two (or more) merchants within a predetermined time period, such as within the same hour, on the same day, or in the same week. The GCG computing device may create an edge 617 labeled CO_VISIT between merchant 610 and merchant 620. In one embodiment, the GCG computing device filters the total transaction data stored in edge 615 to find unique cardholders that visited both merchants 610 and 620 in the same hour.

Edge 617 provides even greater intelligence regarding the purchasing habits of cardholder 650. For example, the GCG computing device may determine that cardholder 650 co-visits merchant 610 (foodstuffs) and merchant 620 (baby care) because cardholder 650 needs to replenish foodstuffs and baby care items at approximately the same time of the month. It is possible that cardholder 650 is not even aware that merchant 610 offers baby care items in addition to foodstuffs, or that cardholder 650 does not believe the baby care items at merchant 610 would be of suitable quality. In such a case, the GCG computing device determines the co-visit relationship and may generate recommendations for cardholder 650 to visit merchant 610 including one or more offers encouraging cardholder 650 to purchase both baby care items and foodstuffs from merchant 610.

In yet another embodiment, the GCG computing device may filter transaction data stored in the IS_CO-VENDOR edge to search for "sequence of visit" data. A "sequence of visit" is understood herein to be a particular order in which a cardholder visits merchants. In the exemplary embodiment, cardholder 650 may be found to always visit merchant 610, then merchant 620, then merchant 630, based on specific and/or repeated sequences of transactions at the three merchants. The GCG computing device extracts these sequences and generates edges (not shown) labeled, for example, IS_VISITED_BEFORE or IS_VISITED_AFTER between merchants. Sequence of visit data results in the GCG computing device recommending to, for example, merchants earlier in the sequence to offer discounts or deals on products for merchants later in the sequence. Cardholders may be encouraged to spend specific amounts at merchants earlier in the sequence in order to gain rewards or discounts at merchants later in the sequence.

Configuration 600 shows how a graph database makes it easy to determine relationships such as that embodied by edge 638, unlike a relational database where such relationships are difficult or impossible to elicit. In the exemplary embodiment, the GCG computing device determines that cardholder 614 is a customer of merchant 610, which has cardholder 650 as a customer, which in turn is a customer of merchant 630. In another embodiment, one generated edge may give rise to another. For example, once there is edge 635 between merchant 610 and merchant 630, the GCG computing device may create edge 638 based on the newly generated IS_CO-VENDOR edge 635, rather than traversing edges 614, 616, and 634, as in the exemplary embodiment immediately above.

In addition to generating edges, the GCG computing device is also configured to generate nodes that represent data that does not exist as a singular table or row in a relational database. For example, the GCG computing device may create a node (not shown) labeled "Cardholders Co-Visiting Merchants To Buy Foodstuffs and Baby care items." In one embodiment, this node will connect to, for example, cardholder 650 as in the exemplary embodiment above, but also many other cardholders who purchase both foodstuffs and baby care items and whose purchase habits meet the definition of co-visit. The GCG computing device may generate a list of the agglomeration of cardholders connecting to the above node for use by merchants that sell both products, in order to generate recommendations and drive traffic toward offers and special programs.

In another embodiment, the GCG computing device determines that merchant 610 is enrolled in a special program offered by, for example, a payment processor. The GCG computing device is configured to observe changes in transaction data over time, for merchant 610. If transaction volume rises at merchant 610, for example beyond a certain threshold, the GCG computing device determines that the special program has proven lucrative for merchant 610. Accordingly, the GCG computing device recommends the special program to merchants in CO_VENDOR relationships with merchant 610, e.g., merchant 620. Moreover, if transaction volume rises at merchant 610, the GCG computing device is configured to recommend the special program to other merchants in CO_VENDOR relationships with merchant 610, thus improving customer satisfaction.

Figure 7:
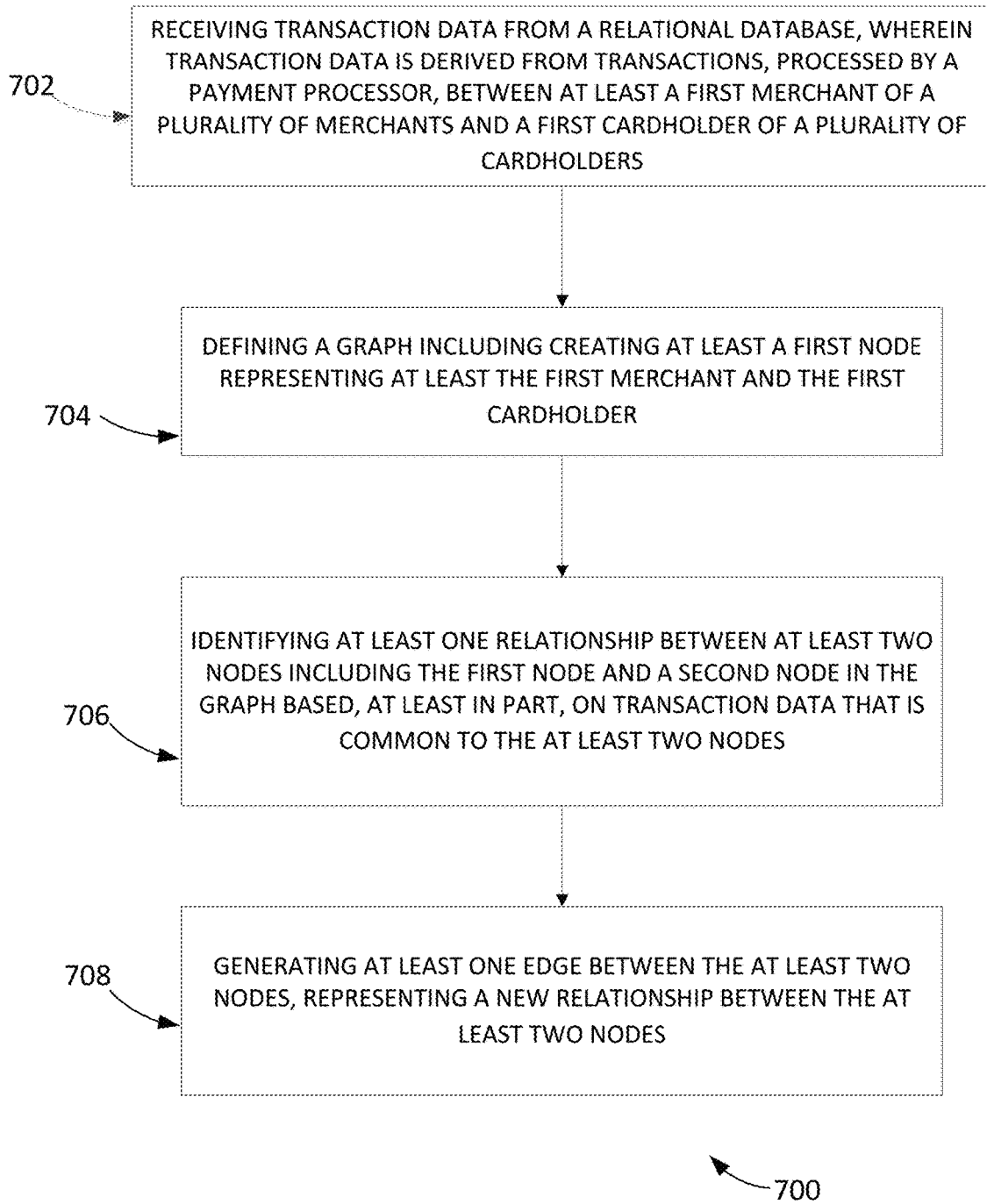
FIG. 7 is an example method 700 by which the GCG computing device generates new edges in the graph database.

FIG. 7 is an example method 700 by which the GCG computing device generates new edges in the graph database. In the exemplary embodiment, the GCG computing device receives 702 transaction data from a relational database, wherein transaction data is derived from transactions, processed by a payment processor, between at least a first merchant of a plurality of merchants and a first cardholder of a plurality of cardholders. The GCG computing device defines 704 a graph including creating at least a first node representing at least the first merchant and a second node representing the first cardholder. The GCG computing device identifies 706 at least one relationship between at least two nodes in the graph based, at least in part, on transaction data that is common to the at least two nodes. Then the GCG computing device generates 708 at least one edge between the at least two nodes, representing a new relationship between the at least two nodes.

Figure 8:
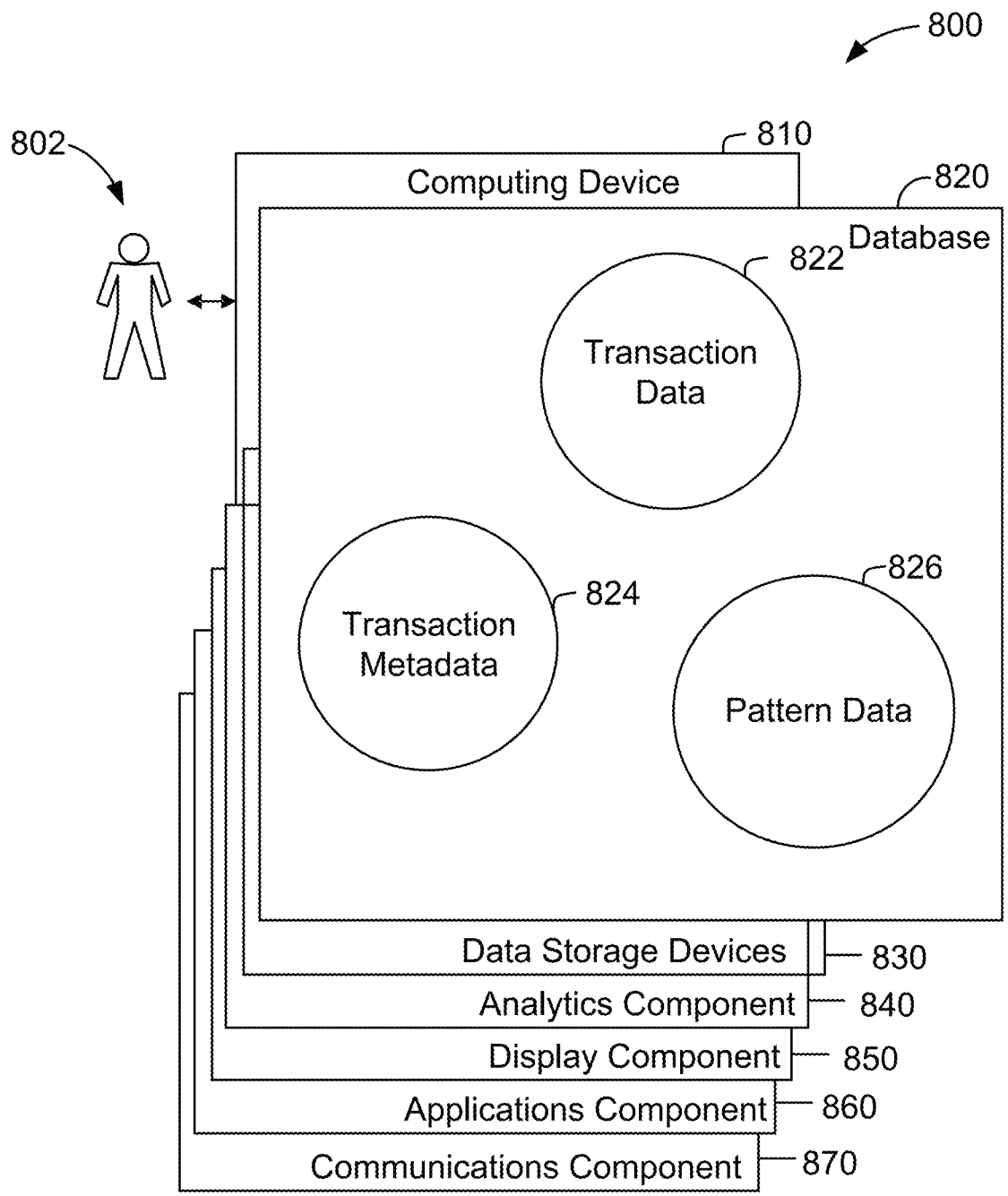
FIG. 8 shows an example configuration of a database within a computing device that, along with other related computing components, may be used to generate and maintain a graph database.

FIG. 8 shows an example configuration of a database within a computing device that, along with other related computing components, may be used to generate and maintain a graph database. In some embodiments, computing device 810 is similar to GCG computing device 170 (shown in FIG. 2). In some embodiments, database 820 is similar to database 120 or graph database 160 (shown in FIG. 2). In the example embodiment, database 820 includes transaction data 822, transaction metadata 824, and pattern data 826. Transaction data 822 includes data regarding each transaction processed by a payment processor, such as date, time, location, merchant ID, transaction amount, and payment card used for transaction. Transaction metadata 824 includes data about every node (e.g. merchant data, card data, special programs/services, geographical data, and the like). Pattern data 826 includes data regarding trends observed in transaction data 822 (e.g., evidence of co-visits, particular sequences of visits, and particular groups of cardholders visiting specific merchants at specific times).

Computing device 810 also includes data storage devices 830. Computing device 810 also includes analytics component 840 that is configured to analyze transaction data 822 and, in one embodiment, generate pattern data 826. Computing device 810 also includes display component 850 that is configured to display visual representations of all or part of the graph database for review by users of computing device 810. Computing device 810 also includes applications component 860, which is configured to generate recommendations for cardholders and merchants based on pattern data 826, and also to determine incidences of fraud where pattern data 826 reveals multiple reports of fraud from, for example, a particular merchant. Computing device 810 also includes communications component 870 that is configured to communicate at least with merchants and cardholders to issue recommendations and notices of fraud.

As will be appreciated based on the foregoing specification, the above-described embodiments of the disclosure may be implemented using computer programming or engineering techniques including computer software, firmware, hardware or any combination or subset thereof, wherein the technical effect is to reduce data load on existing computer systems (e.g. by reducing fraudulent transactions), and reduce redundant queries (e.g., the large join operations required to extract interesting relationships from a relational database table). Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of generating graph data components stored in a graph database, the method implemented using a graph component generator computing device in communication with the graph database and a payment processor, the graph component generator computing device including one or more processors in communication with a memory, the method comprising:

extracting transaction data from a relational database, wherein the transaction data is derived from financial transactions, processed by the payment processor, between at least a first merchant of a plurality of merchants and a first cardholder of a plurality of cardholders;

converting the transaction data from a relational database format into a graph database format by:
representing each table in the relational database as a label;
converting each row of a corresponding table into a node;
converting each column of the corresponding table into an attribute of the node; and
storing the converted transaction data in the graph database;

defining a graph including a plurality of nodes, the plurality of nodes including at least a first node representing the first merchant and a second node representing the first cardholder;

identifying a relationship between the first node and the second node in the graph based, at least in part, on transaction data that is common to the first node and the second node;

generating a first edge between the first and second nodes, the first edge representing a relationship between the first and second nodes;

updating the graph database with the first generated edge to store the relationship between the first and second nodes;

determining, based on the first generated edge and at least one second generated edge in the graph, an additional relationship between the first node and a third node in the graph, wherein the third node represents a second merchant;

generating a third edge between the first node and the third node, the third edge representing the additional relationship;

updating the graph database with the third edge;

receiving, from a user, a search request including a criterion;

identifying the first merchant as satisfying the criterion;

searching, in response to the identification of the first merchant, the graph database for additional merchants associated with the first merchant; and transmitting, to the user based on the third edge, an identification of the first merchant and the second merchant.

2. A method in accordance with claim 1, further comprising generating an additional edge based on at least the third edge, wherein the additional edge represents a co-visit relationship, wherein the co-visit relationship denotes the cardholder performing one or more transactions at at least two merchants of the plurality of merchants within a predetermined period of time.

3. A method in accordance with claim 1, further comprising generating an additional edge based on at least the third edge, wherein the additional edge represents a sequence-of-visit relationship, wherein the sequence-of-visit relationship denotes the cardholder performing one or more transactions at at least two merchants of the plurality of merchants in a predetermined order.

4. A method in accordance with claim 1, further comprising identifying that a second cardholder who has transacted with at least one of the first merchant and the second merchant will transact with the other of the first and second merchants based on the identified relationship.

5. A method in accordance with claim 1, wherein generating the first edge between the first and second nodes further comprises:

determining that a transaction volume between the first and second nodes exceeds a predetermined threshold; and
assigning a weight value to the first edge based on the transaction volume.

6. A method in accordance with claim 1, further comprising
generating a notification for the first cardholder, including an alert signifying an incidence of fraud at the first merchant.

7. A method in accordance with claim 1, wherein defining the graph includes generating an aggregate node defining a plurality of nodes each representing at least one of a plurality of merchants and a plurality of cardholders and generating an aggregate edge representing a plurality of edges.

8. A system for generating graph data components stored in a graph database, the system comprising:

a graph database configured to store transaction data in a graph format;

a graph component generator computing device (GCG) configured to be coupled to the graph database and a payment processor, the GCG including one or more processors in communication with a memory, the GCG further configured to:

extract transaction data from a relational database, wherein the transaction data is derived from financial transactions, processed by the payment processor, between at least a first merchant of a plurality of merchants and a first cardholder of a plurality of cardholders;

convert the transaction data from a relational database format into a graph database format by:
representing each table in the relational database as a label;
converting each row of a corresponding table into a node;
converting each column of the corresponding table into an attribute of the node; and
storing the converted transaction data in the graph database;

define a graph including a plurality of nodes, the plurality of nodes including at least a first node representing the first merchant and a second node representing the first cardholder;

identify a relationship between the first node and the second node in the graph based, at least in part, on transaction data that is common to the first node and the second node;

generate a first edge between the first and second nodes, the first edge representing a relationship between the first and second nodes;

update the graph database with the first generated edge to store the relationship between the first and second nodes;

determine, based on the first generated edge and at least one second generated edge in the graph, an additional relationship between the first node and a third node in the graph, wherein the third node represents a second merchant;
generate a third edge between the first node and the third node, the third edge representing the additional relationship;
update the graph database with the third edge;
receive, from a user, a search request including a criterion;
identify the first merchant as satisfying the criterion;
search, in response to the identification of the first merchant, the graph database for additional merchants associated with the first merchant; and
transmit, to the user based on the third edge, an identification of the first merchant and the second merchant.

9. A system in accordance with claim 8, wherein the GCG is further configured to generate an additional edge based on at least the third edge, wherein the additional edge represents a co-visit relationship, wherein the co-visit relationship denotes the cardholder performing one or more transactions at at least two merchants of the plurality of merchants within a predetermined period of time.

10. A system in accordance with claim 8, wherein the GCG is further configured to generate an additional edge based on at least the third edge, wherein the additional edge represents a sequence-of-visit relationship, wherein the sequence-of-visit relationship denotes the cardholder performing one or more transactions at at least two merchants of the plurality of merchants in a predetermined order.

11. A system in accordance with claim 8, wherein the GCG is further configured to identify that a second cardholder who has transacted with at least one of the first merchant and the second merchant will transact with the other of the first and second merchants based on the identified relationship.

12. A system in accordance with claim 8 wherein, to generate the first edge between the first and second nodes, the GCG is further configured to:
determine that a transaction volume between the first and second nodes exceeds a predetermined threshold; and
assign a weight value to the first edge based on the transaction volume.

13. A system in accordance with claim 8, wherein the GCG is further configured to generate a notification for the first cardholder, including an alert signifying an incidence of fraud at the first merchant.

14. A system in accordance with claim 8, wherein defining the graph includes generating an aggregate node defining a plurality of nodes each representing at least one of a plurality of merchants and a plurality of cardholders and generating an aggregate edge representing a plurality of edges.

15. A non-transitory computer readable medium that includes computer executable instructions for generating graph data components stored in a graph database, wherein when executed by a graph component generator computing device (GCG) coupled to the graph database and a payment processor, the computer executable instructions cause the GCG to:
extract transaction data from a relational database, wherein the transaction data is derived from financial transactions, processed by the payment processor, between at least a first merchant of a plurality of merchants and a first cardholder of a plurality of cardholders;
convert the transaction data from a relational database format into a graph database format by:
representing each table in the relational database as a label;
converting each row of a corresponding table into a node;
converting each column of the corresponding table into an attribute of the node; and
storing the converted transaction data in the graph database;
define a graph including a plurality of nodes, the plurality of nodes including at least a first node representing the first merchant and a second node representing the first cardholder;
identify a relationship between the first node and the second node in the graph based, at least in part, on transaction data that is common to the first node and the second node;
generate a first edge between the first and second nodes, the first edge representing a relationship between the first and second nodes;
update the graph database with the first generated edge to store the relationship between the first and second nodes;
determine, based on the first generated edge and at least one second generated edge in the graph, an additional relationship between the first node and a third node in the graph, wherein the third node represents a second merchant;
generate a third edge between the first node and the third node, the third edge representing the additional relationship;
update the graph database with the third edge,
receive, from a user, a search request including a criterion;
identify the first merchant as satisfying the criterion;
search, in response to the identification of the first merchant, the graph database for additional merchants associated with the first merchant; and
transmit, to the user based on the third edge, an identification of the first merchant and the second merchant.

16. A non-transitory computer readable medium in accordance with claim 15, wherein the computer executable instructions cause the GCG to generate an additional edge based on at least the third edge, wherein the additional edge represents a co-visit relationship, wherein the co-visit relationship denotes the cardholder performing one or more transactions at at least two merchants of the plurality of merchants within a predetermined period of time.

17. A non-transitory computer readable medium in accordance with claim 15, wherein the computer executable instructions cause the GCG to generate an additional edge based on at least the third edge, wherein the additional edge represents a sequence-of-visit relationship, wherein the sequence-of-visit relationship denotes the cardholder performing one or more transactions at at least two merchants of the plurality of merchants in a predetermined order.

18. A non-transitory computer readable medium in accordance with claim 15, wherein the computer executable instructions cause the GCG to identify that a second cardholder who has transacted with at least one of the first merchant and the second merchant will transact with the other of the first and second merchants based on the identified relationship.

19. A non-transitory computer readable medium in accordance with claim 15 wherein, to generate the first edge between the first and second nodes, the computer executable instructions cause the GCG to:
determine that a transaction volume between the first and second nodes exceeds a predetermined threshold; and assign a weight value to the first edge based on the transaction volume.

20. A non-transitory computer readable medium in accordance with claim 15, wherein the computer executable instructions cause the GCG to generate a notification for the first cardholder, including an alert signifying an incidence of fraud at the first merchant.

21. A non-transitory computer readable medium in accordance with claim 15, wherein defining the graph includes generating an aggregate node defining a plurality of nodes each representing at least one of a plurality of merchants and a plurality of cardholders and generating an aggregate edge representing a plurality of edges.

\* \* \* \* \*